May 28, 1957 H. P. LUHN 2,794,081

CIRCUIT SELECTOR

Filed Jan. 12, 1955 3 Sheets-Sheet 1

INVENTOR.
HANS P. LUHN

BY Joe L. Koerber

May 28, 1957 H. P. LUHN 2,794,081

CIRCUIT SELECTOR

Filed Jan. 12, 1955 3 Sheets-Sheet 2

INVENTOR.
HANS P. LUHN

BY Joe L. Koerber

May 28, 1957 H. P. LUHN 2,794,081

CIRCUIT SELECTOR

Filed Jan. 12, 1955 3 Sheets-Sheet 3

INVENTOR.
HANS P. LUHN

BY Joe L. Koerber 2,794,081

CIRCUIT SELECTOR

Hans P. Luhn, Armonk, N. Y., assignor to International Business Machines Corporation, New York, N. Y., a corporation of New York Application January 12, 1955, Serial No. 481,415

4 Claims. (Cl. 200—14)

This invention relates to an electric circuit selector and more particularly to a dial type selector.

Using conventional switching methods, a great plurality of switches are required for connecting a single input line, selectively, for example, to any one of one hundred output lines.

A typical switching arrangement for accomplishing the above selective switching would require eleven dial switches having ten contacts each. The first of said dial switches would be adjustable to any one of ten positions for selecting one of the remaining ten switches. Operation of the selected switch would then select one of the ten lines controlled thereby.

The present invention provides a simplified means of accomplishing the above described switching by the manipulation of only two dial switches rather than the manipulating of one given switch and a selected one of ten other switches.

It is an object of the present invention to provide an improved switching device.

Another object of the present invention is to provide a simple and compact switching device.

Still another object of the present invention is to provide a switching device having relatively few parts and yet being capable of selecting any one of a large number of circuits.

Yet another object of the present invention is to provide a switching device having dials each movable to a predetermined number of positions, said dials being operative to select any one of a number of circuits equal to the product of the number of positions for one dial by the number of positions for the other dial.

Other objects of the invention will be pointed out in the following description and claims and illustrated in the accompanying drawings, which disclose, by way of example, the principle of the invention and the best mode, which has been contemplated, of applying that principle.

Figure 1:
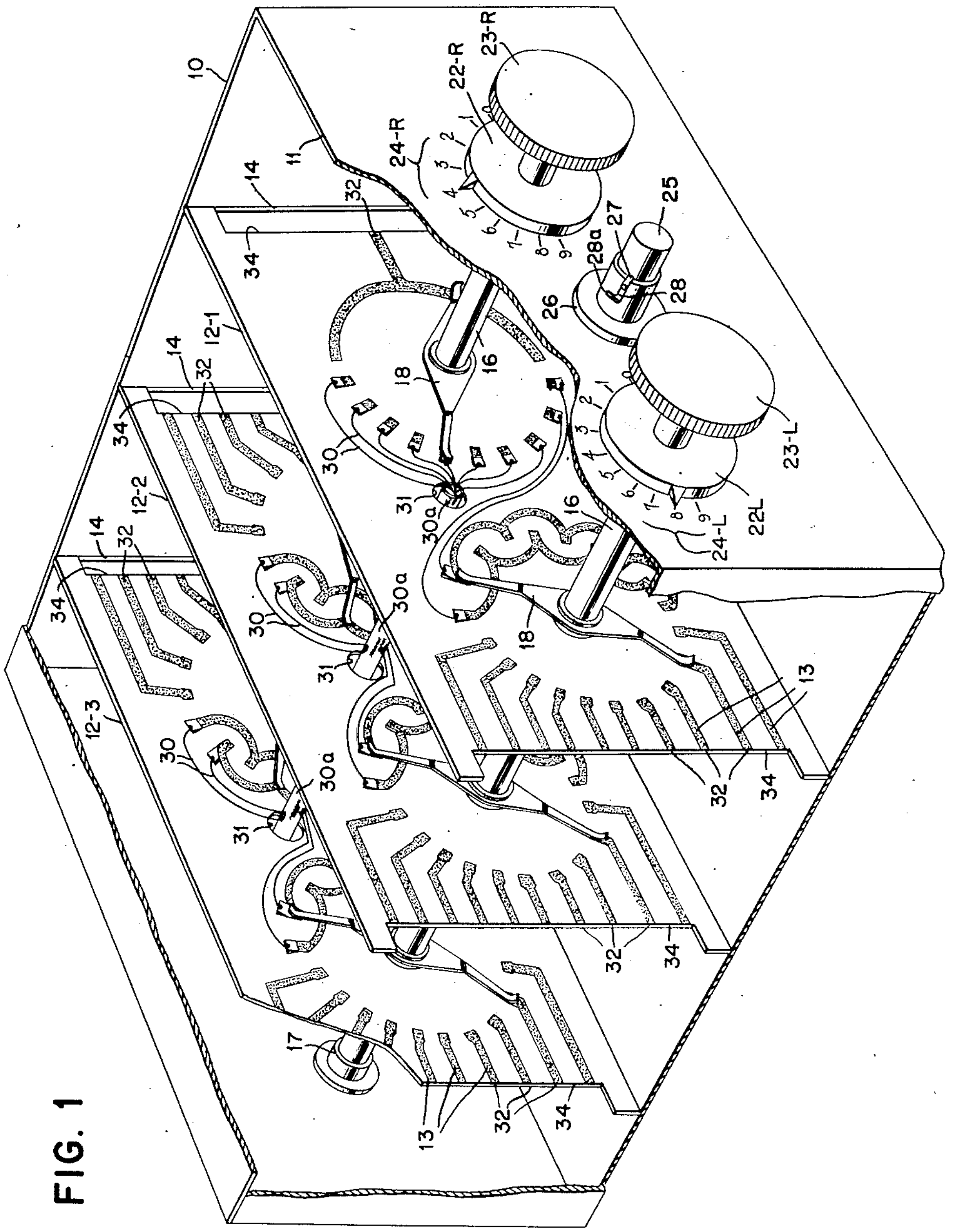
Fig. 1 is a perspective view of the improved switching device with parts broken away to facilitate illustration.

Referring to Fig. 1, a rectangular housing 10 having a front panel 11 is provided for the switch mechanism. Three phenolic plates 12–1, 12–2 and 12–3 having printed circuits generally designated 13 on each side thereof are supported in an upright position within the housing by means of grooves 14 that are formed in the housing walls. A pair of shafts 16 extend through holes in the front panel 11 and the phenolic plates 12 and into journals 17 that are fixed to the rear panel of the housing 10. Each shaft 16 carries six conducting wipers 18 supported thereon by collars 19 (Fig. 3) pinned to the shaft 16 by pins

20. The wipers 18 are flexed to exert contacting pressure on the circuits 13.

Mounted on the shafts 16 outside the housing panel 11 are index members 22–L (left) and 22–R (right) and operating knobs 23–L and 23–R. The index members cooperate with numerical indices 24–L and 24–R to indicate any setting of the wipers 18 with respect to the printed circuits 13.

A push button 25 is spring biased outwardly by an internal compression spring (not shown) concealed in a sleeve member 26 fixed to the panel 11. The push button 25 carries a pin 27 adapted to travel in a slot 28, formed in the sleeve 26, when the push button is actuated. The function of the push button 25 will be explained hereinafter. After the push button 25 is actuated, a clockwise twist of the button will latch the pin 27 in a detent portion 28*a* of the slot 28 to hold the button 25 in its actuated position.

Electrical connections between the printed circuits are made by conductors 30 that pass from one plate to the next through openings 31 in the plates 12. The conductors 30 form a cable 30*a*.

Figure 2:
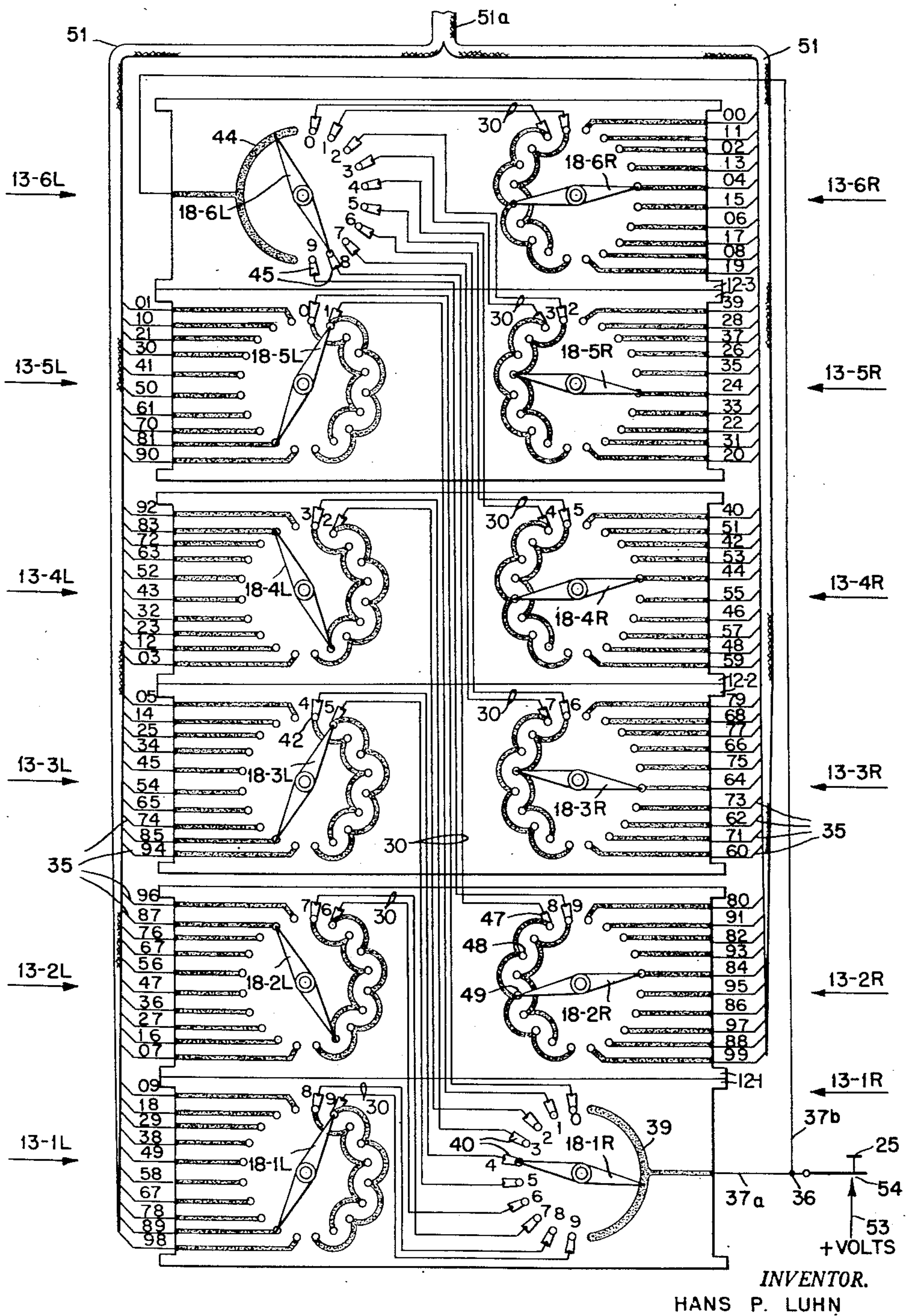
Fig. 2 is a schematic diagram of the switching device and the circuits connected thereto.

External connections to the circuit 13 are made at points at each end of the plates 12 that are designated 32. Referring to Fig. 2, the six printed circuits 13 are shown as well as the wipers 18, the internal connections 30 between the various printed circuits 13, and the external connections to the circuits 13, herein generally designated 35. The plates 12 are recessed as at 34 (Fig. 1) to accommodate the external wires 35 between the plates 12 and the housing 10.

The printed circuits 13 as shown in Fig. 2 are further identified by suffixes for clarity. The circuits 13–1L, 13–1R, 13–3L, 13–3R, 13–5L and 13–5R represent the printed circuits appearing on the front sides of the plates 12–1, 12–2 and 12–3 respectively as shown in Fig. 1. The circuits 13–2L and 13–2R are on the back side of the plate 12–1; the circuits 13–4L and 13–4R are on the back side of the plate 12–2; and the circuits 13–6L and 13–6R are on the back side of the plate 12–3.

The individual wipers 18 are further identified, from bottom to top in Figs. 2, as 18–1L (left), 18–1R (right), 18–2L, 18–2R, 18–3L, 18–3R, 18–4L, 18–4R, 18–5L, 18–5R, 18–6L and 18–6R.

It will be noted that Fig. 2 shows a developed view of the plates 12–1, 12–2 and 12–3 in which alternate left-hand (and right-hand) wipers appear to be differently oriented; however, in their normal back to back positions all the left-hand wipers 18 will point in one direction, and all of the right hand wipers 18 will point in one direction. When the index member 22–L is rotated to ont of the points of the index 24–L, all of the left-hand wipers 18 are rotated to corresponding contacts of the left-hand circuits 13. Rotation of the index member 22–R similarly positions all of the right-hand wipers 18 at corresponding contacts of the right-hand circuits 13. The index members 22–L and 22–R represent respectively the tens and units orders of numbers ranging from 00 to 99 and any one of one hundred load lines 35 may be connected with a point 36 by setting the two members 22–L and 22–R. For example, if it is desired to connect the load line 35–84 with the point 36, the member 22–L is set on the number 8 of the index 24–L and the member 22–R is set on the number 4 of the index 24–L. For each of one hundred possible combinations of index settings, a different circuit will be completed from the point 36 through one of a pair of lines 37*a* and 37*b* in accordance with the particular index combination. Assuming that the dials are set at 8 and 4 as described, one circuit runs from the point 36 through the line 37*a* to a semi-circular contact 39 of the printed circuit 13–1R, through the wiper 18–1R to a contact 40–4, through one of the lines 30, to a contact 42 of the printed circuit 13–3L. Contacts 40–0 and 40–1 are connected to the circuit 13–5L; contacts 40–2 and 40–3 are connected to the corcuit 13–4L; contacts 40–4 and 40–5 are connected to the circuit 13–3L; contacts 40–6 and 40–7 are connected to the circuit 13–2L; and contacts 40–8 and 40–9 are connected to the circuit 13–1L. It will be noted that the connection at 42 is common connected with alternate ones of ten similar contacts and that the wiper 18–3L is not in contact with any of the above mentioned common connected contacts. The circuit traced to the point 42 comes to a dead end indicating that the complete circuit must be through the line **37*b*, to a semi-circular contact 44, through the conducting wiper 18–6L to a contact 45–8, through one of the lines 30, to a contact 47 of the printed circuit 13–2R, through common connected contacts 48 and 49 and the conducting wiper 18–2R to the load line 35–84 which is the line corresponding to the settings of the index members 22–L and 22–R. The contacts 45–0 and 45–1 are connected to the circuits 13–6R; the contacts 45–2 and 45–3 are connected to the circuit 13–5R; the contacts 45–4 and 45–5 are connected to the circuit 13–4R; the contacts 45–6 and 45–7 are connected to the circuit 13–3R; and the contacts 45–8 and 45–9 are connected to the circuit 13–2R. Therefore, for any combination of index member settings, one circuit and only one will be completed from the point 36** to a line corresponding to the index member setting.

Figures 3, 4:
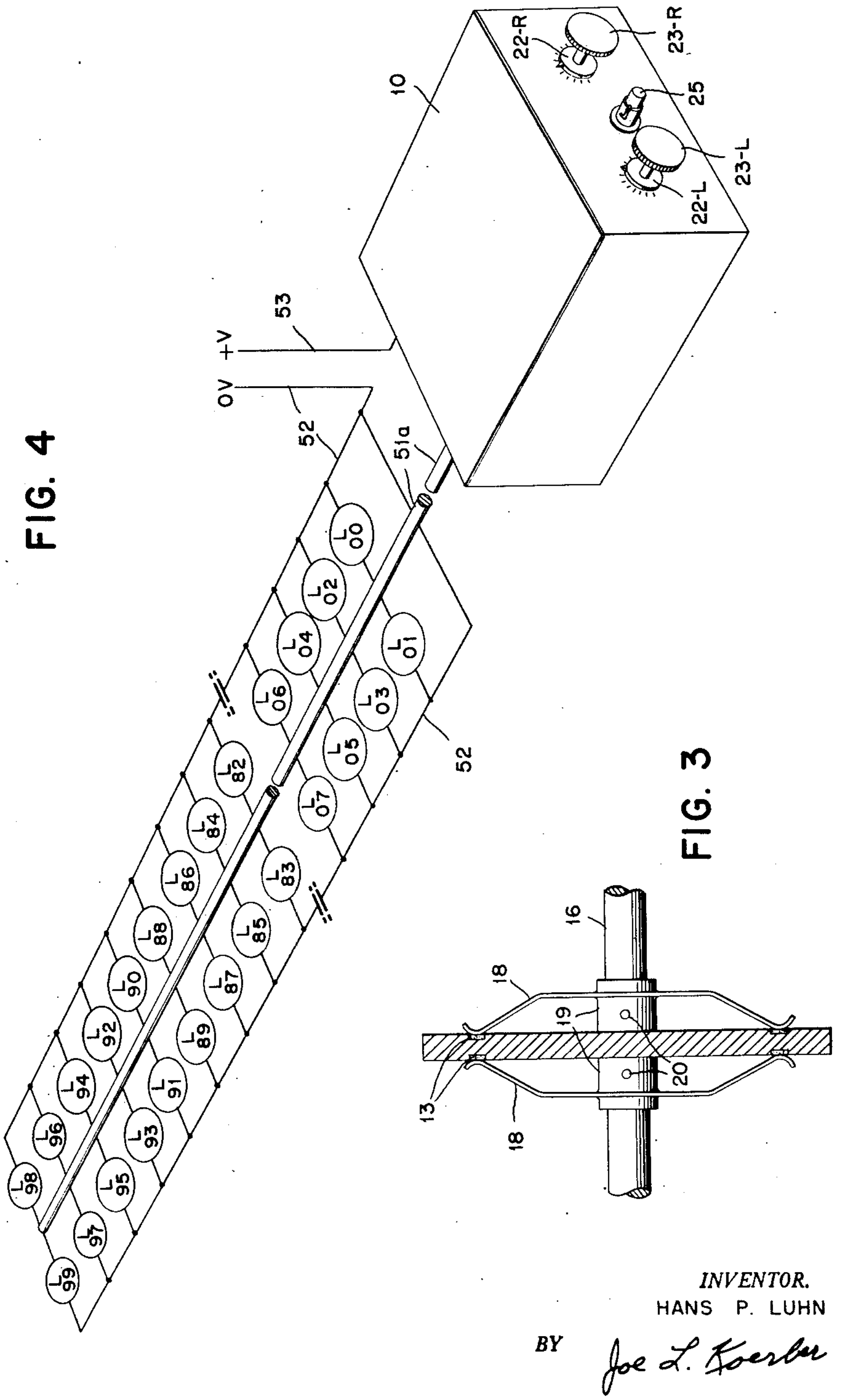
Fig. 3 is a sectional view of a contact plate and shows contact wipers associated therewith.
Fig. 4 is a schematic diagram showing a plurality of load devices connected to the switch device of Fig. 1.

The lines 35–00 through 35–99 are formed into cables 51 along either side of the plates 12 and are joined to form a large cable **51*a*. Referring to Fig. 4, the cable 51*a* leads to one hundred load devices L–00 through L–99. Each load device is connected on the cable side to a corresponding line 35 and on the other side to a zero potential line 52. The point 36 may be connected to a positive potential line 53 through contacts 54 that are operable by the push button 25. Latching the pin 27 in the detent 28*a* maintains the contacts 54** in a closed position.

To apply a potential across a selected one of the one hundred load devices, the numeric designation of the selected device is ascertained, the index members 22–L and 22–R are set according to the numeric designation and the switch contacts 54 are closed to complete a circuit from the positive line 53, through the contacts 54 and the selected switch circuit and through the selected load device to the zero potential line 52. It will be understood that the load devices may be of many varieties, for example, bells, lights, motors, solenoids, etc.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A circuit selector comprising a single input line having a first and a second input sector, first and second sets of connecting terminals associated respectively with said first and said second input sectors, a plurality of connecting sectors arranged in pairs, said pairs being divided equally into a first and a second group, said sectors of said second group being electrically connected with said first set of said connecting terminals, said sectors of said first group being electrically connected with said second set of said connecting terminals, a set of output terminals associated with each said pair of connecting sectors, first and second rotatable contact means for connecting said first and second input sectors respectively with said first and second sets of connecting terminals, a plurality of rotatable contact means, one associated with each said pair of connecting sectors for connecting said sectors with said associated output terminals, first index means commonly connected to said first rotatable contact means and said rotatable contact means of said first group for effecting common positioning of said commonly connected rotatable means, second index means commonly connected to said second rotatable contact means and said rotatable contact means of said second group for effecting common positioning of last said commonly connected rotatable means, whereby for each different combination of settings of said first and second index means, said input line is connected with a different terminal.

2. A device for connecting a single input terminal selectively to one hundred output terminals comprising, in combination, a first distributor assembly having a common contact sector connected with said input terminal, ten distributor contacts arranged in an arc and having a conductor rotatably mounted for connecting said ten contacts selectively with said sector, a first set of five contact assemblies each having two common contact sectors, ten output contacts and a conductor rotatably mounted for connecting alternate ones of said output contacts selectively with one said common sector and for connecting intermediate alternate ones of said output contacts selectively with the other said common sector, first means common to said rotatable conductors, and operable for effecting common settings of said conductors with respect to associated said contacts, a second distributor assembly corresponding to first said distributor assembly and connected with said input line, a second set of five contact assemblies corresponding to said first set, second means common to said rotatable conductors of said second distributor assembly and said second set of contact assemblies and operable for effecting common settings of associated said conductors with respect to associated said contacts, means connecting each said contact of said first distributor assembly with a different said sector of said second set of contact assemblies, and means connecting each said contact of said second distributor assembly with a different said sector of said first set of contact assemblies whereby, for each different combination of settings of said rotatable conductors, said input terminal is connected with a different said output terminal.

3. A device for connecting a single input terminal selectively with a plurality of output terminals comprising, in combination, a first distributor assembly having a plurality of arcuately arranged contacts, a first common contact sector connected with said input terminal and means operable for connecting said contacts selectively with said first sector, a first set of contact assemblies, each said set having a plurality of contacts connected with certain said output terminals, pairs of common contact sectors associated with each said plurality of contacts, means associated with each said contact assembly and operable for connecting alternate ones of said plurality of contacts with one of said associated sectors and intermediate alternate ones of said plurality of contacts with the other of said associated sectors, first means common to all said operable means for effecting common settings thereof, a second distributor assembly corresponding to said first distributor assembly, a second set of contact assemblies corresponding to first said set of contact assemblies, second means common to said second distributor assembly and said second set of contact assemblies for effecting common settings of associated operable means, means connecting each said contact of said first distributor assembly with a different said sector of said second contact assemblies and each said contact of said second distributor assembly with a different said sector of said first contact assemblies whereby, for each different combination of settings of said first and second means, said input terminal is connected with a different said output terminal.

4. A device for connecting a single input terminal selectively with a great plurality of output terminals comprising first and second input sectors electrically connected with said input terminal, first and second sets of digit designated connector terminals associated respectively with said first and second input sectors, first and second contact means selectively settable for connecting said digit terminals with respective said first and second sectors; a plurality of digit-designated sectors comprising a first group arranged in pairs and electrically connected with corresponding digit-designated terminals of said second set, a plurality of digit-designated sectors comprising a second group arranged in pairs and electrically connected with corresponding digit-designated terminals of said first set, a plurality of sets of output terminals each said set associated with a said pair of connectors, a first group of contact means selectively settable for connecting sectors of said first sector group with respectively associated said output terminals, a second group of contact means selectively settable for connecting sectors of said second sector group with respectively associated said output terminals, first index means operable for effecting common digital settings of said first contact means and said first group of contact means, second index means operable for effecting common digital settings of said second contact means and said second group of contact means, whereby for each different combination of settings of said first and second index means, said input terminal is connected to a different said output terminal.

References Cited in the file of this patent

UNITED STATES PATENTS

| | | |
|---|---|---|
| 746,577 | Rivenburgh | Dec. 8, 1903 |
| 2,551,943 | Gulow | May 8, 1951 |
| 2,649,513 | Luhn | Aug. 18, 1953 |